US012510425B2

United States Patent
Lee et al.

(10) Patent No.: US 12,510,425 B2
(45) Date of Patent: Dec. 30, 2025

(54) HEAT FLUX SENSOR AND METHOD OF ESTIMATING CORE BODY TEMPERATURE USING THE SAME

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Ho Taik Lee, Suwon-si (KR); Woochul Kim, Seoul (KR); Jiyong Kim, Seoul (KR); Bok Soon Kwon, Suwon-si (KR); Sang Kyu Kim, Suwon-si (KR); Sungho Kim, Suwon-si (KR); Gimin Park, Hanam-si (KR); Seungjai Woo, Seoul (KR); So Young Lee, Suwon-si (KR); Hong Soon Rhee, Suwon-si (KR)

(73) Assignees: SAMSUNG ELECTRONICS CO., LTD., Suwon-si (KR); INDUSTRY-ACADEMIC COOPERATION, YONSEI UNIVERSITY, Seoul (KR)

( * ) Notice: Subject to any disclaimer, the term of this patent is extended or adjusted under 35 U.S.C. 154(b) by 358 days.

(21) Appl. No.: 18/210,360

(22) Filed: Jun. 15, 2023

(65) Prior Publication Data

US 2024/0302223 A1    Sep. 12, 2024

(30) Foreign Application Priority Data

Mar. 10, 2023   (KR) .......................... 10-2023-0031942

(51) Int. Cl.
*G01K 17/00* (2006.01)

(52) U.S. Cl.
CPC .................................. *G01K 17/00* (2013.01)

(58) Field of Classification Search
CPC ..................................................... G01K 17/00
USPC ............................................................ 374/29
See application file for complete search history.

(56) References Cited

U.S. PATENT DOCUMENTS

2020/0378843 A1*  12/2020  Moriwaki ............. G01K 17/08

FOREIGN PATENT DOCUMENTS

RU         2084844 C1 *   7/1997

OTHER PUBLICATIONS

Translation of RU2084844C1.*

\* cited by examiner

*Primary Examiner* — Mirellys Jagan
(74) *Attorney, Agent, or Firm* — Sughrue Mion, PLLC

(57) ABSTRACT

A heat flux sensor according to an embodiment of the present disclosure includes: a thermogalvanic cell; a first electrode and a second electrode which are respectively disposed on a first surface and a second surface of the thermogalvanic cell; and a processor configured to estimate heat flux by measuring a voltage, generated by a temperature difference between the first surface and the second surface, by using the first electrode and the second electrode, wherein core body temperature may be estimated based on the heat flux, estimated by the heat flux sensor, and a skin surface temperature of an object.

15 Claims, 15 Drawing Sheets

(a)

(b)

HEAT FLUX SENSOR AND METHOD OF ESTIMATING CORE BODY TEMPERATURE USING THE SAME

CROSS-REFERENCE TO RELATED APPLICATION(S)

This application claims priority from Korean Patent Application No. 10-2023-0031942, filed on Mar. 10, 2023, in the Korean Intellectual Property Office, the disclosure of which is incorporated herein by reference in its entirety.

BACKGROUND

1. Field

Apparatuses and methods consistent with example embodiments relate to a heat flux sensor and an apparatus and method for estimating a user's core body temperature using the same.

2. Description of the Related Art

Body temperature a vital sign with very important clinical significance. A body temperature sensor may be applied to various applications, such as checking infections in patients, thermal side effects of medications, or ovulation period in women, and the like. However, it is difficult to measure temperature accurately with a portable device, such as a wearable device, due to the size limitation of a temperature sensor.

In a portable device for estimating body temperature, a heat flux sensor used therein generally includes a semiconductor-based material or metal material which has a low Seebeck coefficient, usually ranging from tens to hundreds of $\mu V/K$. In order to measure heat flux effectively, the sensor may be manufactured as a thermopile sensor. However, the thermopile has a drawback of occupying a large area within the portable device, and if any electrical connection is broken, the thermopile may become unusable. Further, the heat flux sensor using the metal or semiconductor-based material has a drawback of being mass-produced by electrochemical plating or vacuum deposition, resulting in a high unit price for the heat flux sensor.

SUMMARY

According to an aspect of the present disclosure, a heat flux sensor may include: a thermogalvanic cell; a first electrode and a second electrode which are respectively disposed on a first surface and a second surface of the thermogalvanic cell; and a processor configured to estimate heat flux based on a voltage difference between the first surface and the second surface, which is measured by using the first electrode and the second electrode.

The heat flux sensor may further include a plurality of thermogalvanic cells including the thermogalvanic cell. The plurality of thermogalvanic cells may be spaced apart from each other by a predetermined distance to be arranged in a grid pattern.

The thermogalvanic cell may contain an electrolyte material.

The electrolyte material may be a solid material produced by absorbing an electrolyte solution.

The solid material may be cellulose.

The heat electrolyte material may be in gel form.

The heat flux sensor may further include a flexible board disposed at a lower portion of the thermogalvanic cell and satisfying a predetermined range of curvature.

The heat flux sensor may further include a blocking member configured to block outside air to prevent evaporation of water in an electrolyte contained in the thermogalvanic cell.

The first electrode and the second electrode may be arranged to oppose each other in a vertical direction of the heat flux sensor, and the heat flux sensor further includes a third electrode and a fourth electrode that are arranged to oppose each other in a first horizontal direction, and a fifth electrode and a sixth electrode that are arranged to oppose each other in a second horizontal direction that is perpendicular to the first horizontal direction. The processor may be further configured to estimate three orthogonal heat fluxes based on the voltage difference between the first electrode and the second electrode, a voltage difference between the third electrode and the fourth electrode, and a voltage difference between the fifth electrode and the sixth electrode.

The processor may be further configured to estimate a sheet resistance of the first electrode, and estimate a surface temperature of the first electrode that is disposed on the first surface, based on the sheet resistance.

The processor may be further configured to create at least one of temperature distribution data and heat flux distribution data based on at least one of the heat flux, and the surface temperature of the first electrode.

According to another aspect of the present disclosure, an electronic device may include: a temperature sensor configured to measure a first temperature of a skin surface when a user comes into contact with the electronic device: a heat flux sensor configured to measure heat flux when the user comes into contact with the electronic device; and a processor configured to estimate a core body temperature of the user based on the first temperature and the heat flux. The heat flux sensor may include a thermogalvanic cell, and a first electrode and a second electrode which are respectively disposed on a first surface and a second surface of the thermogalvanic cell, and is configured to estimate the heat flux based on a voltage difference between the first surface and the second surface, which is measured by using the first electrode and the second electrode.

The electronic device may further include a plurality of thermogalvanic cells including the thermogalvanic cell, wherein the plurality of thermogalvanic cells may be spaced apart from each other by a predetermined distance to be arranged in a grid pattern.

The thermogalvanic cell may contain an electrolyte material.

The electrolyte material may be a solid material produced by absorbing an electrolyte solution.

The temperature sensor may be configured to measure temperature based on an electrical resistance that varies with temperature.

The processor may be further configured to estimate the core body temperature of the user based on a linear combination of the first temperature and a ratio between the heat flux and a predetermined skin heat transfer coefficient.

The electronic device may further include a display or a speaker configured to provide the estimated core body temperature to the user.

According to another aspect of the present disclosure, a smartwatch may include a main body that includes the temperature sensor, the heat flux sensor, and the processor; and a strap connected to both ends of the main body.

According to another aspect of the present disclosure, a method of estimating core body temperature by an electronic device, may include: by using a temperature sensor, measuring a first temperature of a skin surface when a user comes into contact with the electronic device; by using a heat flux sensor, measuring heat flux when the user comes into contact with the electronic device; and estimating a core body temperature of the user based on the first temperature and the measured heat flux, wherein the measuring of the heat flux may include estimating the heat flux by measuring a voltage, generated by a temperature difference between a first surface and a second surface of a thermogalvanic cell disposed in the heat flux sensor, by using a first electrode and a second electrode which are respectively disposed on the first surface and the second surface.

The estimating of the core body temperature may include estimating the core body temperature of the user based on a linear combination of a ratio between the measured heat flux and a predetermined skin heat transfer coefficient with the first temperature.

The method may further include providing the estimated core body temperature to the user through a display or a speaker.

DETAILED DESCRIPTION

Figure 1:
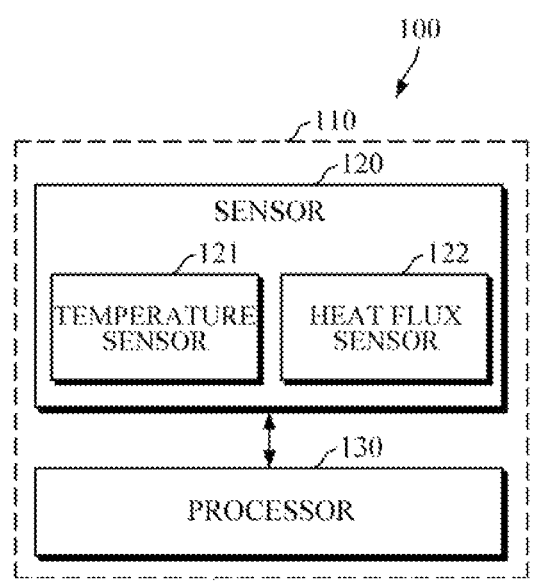
FIG. 1 is a block diagram illustrating an electronic device according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms "first," "second," etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as "unit" or "module," etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

An electronic device according to various embodiments of the present disclosure which will be described below may include, for example, at least one of a wearable device, a smartphone, a tablet PC, a mobile phone, a video phone, an electronic book reader, a desktop computer, a laptop computer, a netbook computer, a workstation, a server, a PDA, a portable multimedia player (PMP), an MP3 player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include, for example, various portable medical measuring devices (antioxidant measuring device, blood glucose monitor, heart rate monitor, blood pressure measuring device, thermometer, etc.), and various medical equipment, such as magnetic resonance angiography (MRA), magnetic resonance imaging (MRI), computed tomography (CT), imaging system, ultrasonic system, and the like. However, the electronic device is not limited to the above devices.

Figure 2A:
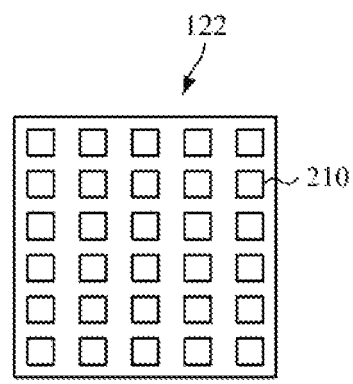
FIGS. 2A and 2B are diagrams illustrating a structure of a heat flux sensor including thermogalvanic cells.
Figure 2B:
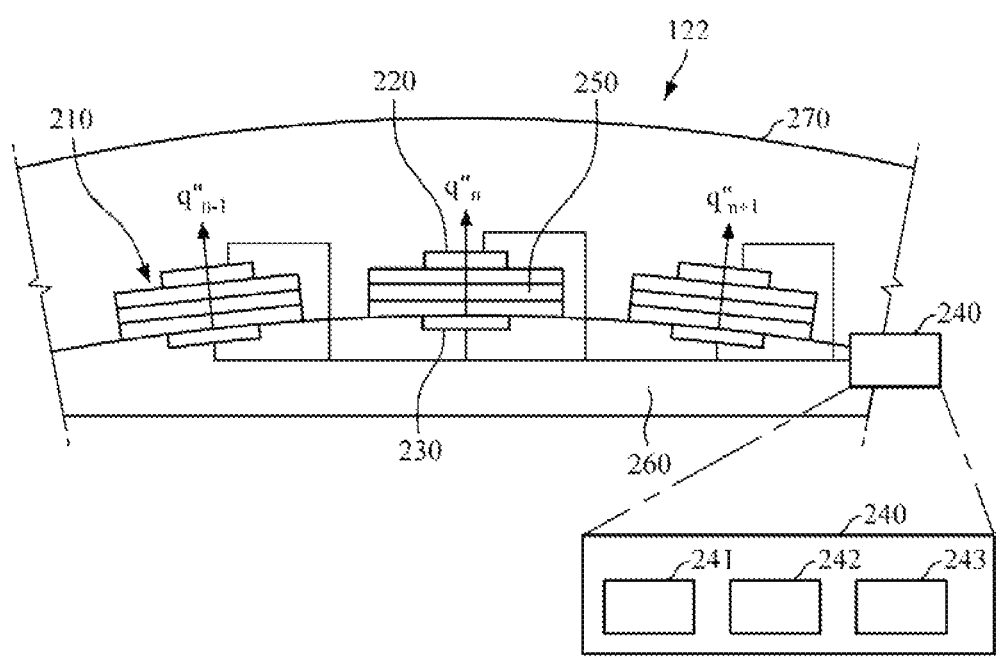

FIG. 1 is a block diagram illustrating an electronic device according to an embodiment of the present disclosure. FIGS. 2A and 2B are diagrams illustrating a structure of a heat flux sensor including thermogalvanic cells.

Referring to FIG. 1, an electronic device 100 may include a sensor 120 and a processor 130 in a main body 110. The sensor 120 may include a temperature sensor 121 and a heat flux sensor 122, and the processor 130 may estimate a user's core body temperature by using data obtained by the sensor 120.

The sensor 120 may include the temperature sensor 121 configured to measure a first temperature of a skin surface when an object comes into contact with the main body 110. The object may be a body part where the core body temperature may be easily measured. For example, the object may be an area on the wrist that is adjacent to the radial artery or an upper part of the wrist where capillary blood or venous blood passes, or a peripheral body part, such as toes and the like, and may also be the ears, forehead, upper arm, chest, and the like.

The temperature sensor 121 may be disposed on one surface (e.g., a lower surface or a position at a predetermined distance, e.g., within 5 mm, above the lower surface). Further, the temperature sensor 121 may be a sensor for measuring temperature based on an electrical resistance that varies with temperature, and may be a contact type temperature sensor such as a thermistor, and may also include a temperature sensor such as a digital temperature sensor, thermopile, and the like. The type of temperature sensor is not limited thereto.

In addition, the sensor 120 may include the heat flux sensor 122 for measuring heat flux when the object comes into contact with the main body 110. The heat flux sensor 122 may include a circuit element for obtaining data for body temperature estimation from a user. The processor 130 may be electrically connected to the heat flux sensor 122 and may control the heat flux sensor 122 in response to a request for core body temperature.

Heat flux is the amount of heat energy passing through a certain surface between two objects when energy transfer (e.g., heat) occurs between two objects having different temperatures, and refers to the rate of heat transfer per unit area. A commonly used heat transfer sensor uses a semiconductor-based material or metal which has electrons or holes, and is based on the Seebeck effect in which an electromotive force is generated in proportion to a temperature difference between an upper portion and a lower portion of a material. However, the semiconductor-based material or metal exhibits low Seebeck coefficients ranging from tens to hundreds of μV/K, and in order to increase the Seebeck coefficient, it is required to use, for example, a thermopile consisting of several thermocouples bundled together and electrically connected to each other. However, the heat flux sensor using the thermopile has drawbacks in that the sensor is bulky and has a high unit price, and if any electrical connection in the material is broken, the sensor may not be used such that durability may not be ensured.

However, a thermogalvanic or thermo-electrochemical effect is a physical phenomenon that directly converts thermal energy into electrical energy, and refers to the effect in which when two electrodes of the same type are deposited on an electrolyte having ions, forming redox pairs, dissolved therein, a change in temperature of the two electrodes causes a change in electrochemical equilibrium between the electrodes and electrolyte, and a potential difference occurs between the two electrodes. In this case, an aqueous electrolyte solution is effective in that the aqueous electrolyte solution has a Seebeck coefficient of several mV/K, which is much higher than the metal or semiconductor-based material, and has low heat conductivity (e.g., about 0.6 W/mK) with high sensitivity to electrical signals.

As described above, a general heat flux sensor using a metal material or semiconductor material has a drawback in that the heat flux sensor increases in volume during manufacturing due to a low Seebeck coefficient, but when the heat flux sensor is manufactured with an electrolyte using the thermogalvanic effect, the heat flux sensor may be manufactured in a relatively small volume.

FIGS. 2A and 2B are diagrams illustrating a planar structure and a cross-sectional structure of a heat flux sensor using the thermogalvanic effect.

For example, the heat flux sensor 122 may include one or more thermogalvanic cells 210, a first electrode 220 and a second electrode 230 respectively disposed on a first surface (e.g., upper surface) and a second surface (e.g., lower surface) of the thermogalvanic cell 210, and a heat flux estimation processor 240 configured to estimate heat flux based on a voltage measured by the first electrode 220 and the second electrode 230. When a plurality of thermogalvanic cells 210 are provided in the heat flux sensor 122, the heat flux sensor 122 may be arranged in a grid pattern as shown in FIG. 2A.

The thermogalvanic cell 210 may be an electrochemical cell that generates electrical energy or electromotive force between two electrodes (the first electrode 220 and the second electrode 230) based on a temperature difference between the first surface and the second surface. An electrolyte material 250 may be contained in the thermogalvanic cell. For example, the electrolyte material may be an ionic solution that facilitates the movement of charged ions between the two electrodes, for example, such as an aqueous potassium ferricyanide ($K_3FE(CN)_6$) solution, and a potassium ferrocyanide ($K_4Fe(CN)_6$) solution, The electrolyte material may exhibit a Seebeck coefficient of about 1.4 mV/K at a concentration of 0.4 M and about 1.5 mV/K at a concentration of 0.1 M. However, other ionic liquids or conductive materials may be employed as the electrolyte material of the thermogalvanic cell 210, as the choice of electrolyte depends on the specific requirements and desired performance of the thermogalvanic cell 210.

An aqueous electrolyte may be used as the electrolyte material 250, and a material having high hygroscopicity or hydrophilicity may be used in order to reflect characteristics that the heat flux sensor should have a constant shape parameter (e.g., thickness). For example, a solid material (e.g., cellulose) produced by absorbing an electrolyte solution may be used.

According to another embodiment of the present disclosure, the electrolyte material 250 may have a gel form and may be realized as a porous electrolyte material having a non-conducting polymer mixed with an aqueous electrolyte solution in order to immobilize the aqueous electrolyte solution. However, the electrolyte material 250 contained in the thermogalvanic cell 210 is not limited thereto.

The heat flux sensor 122 may include one or more thermogalvanic cells 210. For example, the heat flux sensor 122 may be manufactured in a smaller size by providing a small number of thermogalvanic cells 210 in the heat flux sensor 122. In addition, if a plurality of thermogalvanic cells 210 are disposed in the heat flux sensor 122, the plurality of thermogalvanic cells 210 may be arranged in an array, and in order to prevent thermal interference therebetween, the respective thermogalvanic cells 210 may be spaced apart from each other by a predetermined distance (e.g., ranging from 2 mm to 1 cm). Further, the respective thermogalvanic cells 210 may be electrically connected in series or in parallel, and may be connected in parallel for heat flows ($q''_{n-1}$, $q''_n$, and $q''_{n+1}$) from the object to the outside.

The first electrode 220 and the second electrode 230 which are respectively disposed on the first surface (e.g., upper surface) and the second surface (e.g., lower surface) of the thermogalvanic cell 210 may be, for example, in the form of a cold cathode and a hot anode, respectively, but are not limited thereto.

A flexible board 260 that satisfies a predetermined range of curvature (e.g., 30 mm to 60 mm) may be disposed on a lower surface of the thermogalvanic cell 210, and flexible characteristics of the flexible board 260 allow the heat flux sensor 122 to easily contact any object for estimating body temperature.

Further, the heat flux sensor 122 may include a blocking member 270 to prevent evaporation of water from the electrolyte contained in the thermogalvanic cells 210 by blocking outside air. For example, the blocking member 270 may be formed not only of a metal material but also of a soft material such as a polymer, and may be in the form of a single housing that covers the entire heat flux sensor 122 or in the form of a plurality of housings that cover the respective thermogalvanic cells 210. However, the material and shape of the blocking member 270 is not limited thereto.

The heat flux estimation processor 240 may estimate heat flux by measuring a voltage, generated by a temperature difference between the first surface and the second surface, by using the first electrode 220 and the second electrode 230.

For example, the heat flux estimation processor 240 may include a voltmeter 241 configured to measure a voltage difference (W/m²) between the upper surface and the lower surface of the thermogalvanic cell 210 using the first electrode 220 and the second electrode 230, and generate a voltage signal based on the measured voltage difference, an analog-to-digital (ADC) signal converter 242 configured to convert the voltage signal in an analog form into a digital signal, and a processor 243 configured to estimate a heat flux based on the digital signal representing the voltage difference. The voltage difference may be proportional to a temperature difference between the upper surface and the lower surface of the thermogalvanic cell 210, and the processor 243 may estimate the heat flux based on a proportional relationship between the voltage difference and the temperature difference.

In particular, the heat flux estimation processor 240 may estimate heat flux by using an average value of voltages measured for each of the thermogalvanic cells 210. Further, an average value of the measured voltages except a maximum value and a minimum value thereof may also be used, and only a voltage, which is measured from the thermogalvanic cell 210 disposed at a predetermined position desired to be measured, may also be used. A method of estimating heat flux by using voltages obtained from the plurality of thermogalvanic cells 210 is not limited thereto.

Referring back to FIG. 1, the processor 130 may estimate a user's core body temperature based on a first temperature, which is skin surface temperature measured by the temperature sensor 121, and the heat flux measured by the heat flux sensor 122. For example, the processor 130 may estimate the user's core body temperature based on a linear combination of a ratio between the measured heat flux and a predetermined skin heat transfer coefficient with the first temperature, which may be represented by the following Equation 1.

$$T_{core} = T_1 + \frac{HF}{\beta_{skin}}$$ [Equation 1]

Herein, $T_{core}$ denotes the core body temperature, $T_1$ denotes the first temperature which is the skin surface temperature, HF denotes the measured heat flux, and $\beta_{skin}$ denotes the predetermined skin heat transfer coefficient.

In another example, the heat flux sensor 122 based on the thermogalvanic cells 210 may be used for another purpose, other than body temperature estimation.

For example, in order to measure a distribution of wiper temperature in designing a semiconductor, a heat flux sensor including a plurality of thermogalvanic cells may be used instead of a commonly used infrared camera. For example, a temperature distribution (e.g., heat contour or heat map) may be obtained by attaching the heat flux sensor to the wiper and based on the heat flux measured by the respective thermogalvanic cells. In addition, by attaching the heat flux sensor to an electronic device or a vehicle battery, the heat flux sensor may be used for checking a hot spot. The use of the heat flux sensor 122 based on the thermogalvanic cells 210 is not limited thereto.

Figure 3:
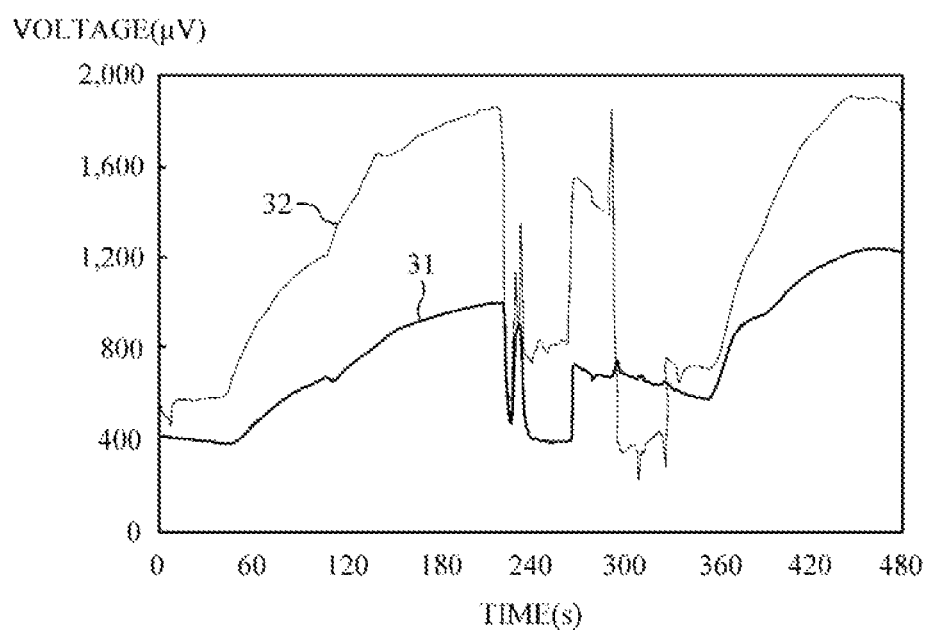
FIG. 3 is a graph showing heat flux signals over time in a heat flux sensor using a metal-based material and a heat flux sensor using thermogalvanic cells.

FIG. 3 is a graph showing heat flux signals over time in a heat flux sensor using a metal-based material and a heat flux sensor using thermogalvanic cells.

Referring to FIG. 3, assuming that the heat flux sensor using the metal-based material (e.g., Seebeck coefficient of 6.0 µV/K and sensitivity of 0.0056 µV/K(W/m²)) and the heat flux sensor using the thermogalvanic cells (e.g., Seebeck coefficient of 1394.4 µV/K and sensitivity of 0.8366 µV/K(W/m²)) have the same thickness (e.g., 360 µm), it can be seen that a voltage 32 output from the heat flux sensor using the thermogalvanic cells is greater than a voltage 31 output from the heat flux sensor using the metal-based material, such that the voltage 32 may be converted into the heat flux more easily. Accordingly, based on the above, it can be seen that the heat flux sensor based on the thermogalvanic cells may be manufactured in a smaller size than the existing heat flux sensor using the metal-based material, and as a result, a device including the heat flux sensor may be manufactured in a compact size.

Figure 4:
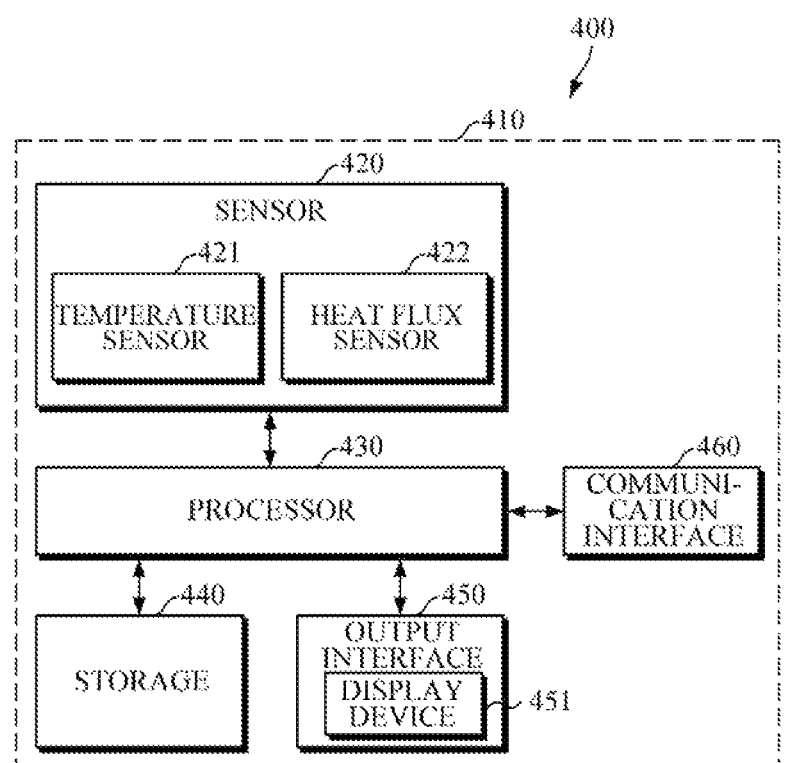
FIG. 4 is a block diagram illustrating an electronic device according to another embodiment of the present disclosure.

FIG. 4 is a block diagram illustrating an electronic device according to another embodiment of the present disclosure.

Referring to FIG. 4, an electronic device 400 includes, in a main body 410, a sensor 422 including a temperature sensor 421 and a heat flux sensor 422, a processor 430, a storage 440, an output interface 450, and a communication interface 460. The output interface 450 may include a display device 451. The temperature sensor 421, the heat flux sensor 422, and the processor 430 are the same as the temperature sensor 121, the heat flux sensor 122, and the processor 130 in the embodiment of FIG. 1, such that a detailed description thereof will be omitted.

The storage 440 may store information related to estimating core body temperature. For example, the storage 440 may store the first temperature, estimated heat flux, skin heat transfer coefficient, and processing results of the processor 430, e.g., a user's body temperature, and the like.

The storage 440 may include a storage medium having at least one type of a flash memory type, a hard disk type, a multimedia card micro type, a card type (e.g., a SD memory, a XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk, etc., but is not limited thereto.

The output interface 450 may provide the processing results of the processor 430 to a user. For example, the output interface 450 may provide the estimated core body temperature to the user by a visual method. In this case, if the estimated core body temperature value falls outside a normal range, the output interface 450 may provide the user with warning information by changing color, line thickness, etc., or by displaying the abnormal value along with the normal range, so that the user may easily recognize the estimated value. Further, along with or without the visual display of the body temperature information on the display device 451, the output interface 450 may also provide the user with the body temperature information in a non-visual manner by voice, vibrations, tactile sensation, and the like using an audio module (e.g., voice output module) such as a speaker and the like, or a haptic module.

The audio module may convert a sound into an electrical signal or vice versa. The audio module may output the sound via a speaker and/or a headphone of another electronic device directly or wirelessly connected to a body temperature estimation device. In addition, the haptic module may convert an electrical signal into a mechanical stimulus (e.g., vibration, motion, etc.) or electrical stimulus which may be recognized by a user by tactile sensation or kinesthetic sensation. The haptic module may include, for example, a motor, a piezoelectric element, and/or an electric stimulator.

The display device 451 may include, for example, a display, a hologram device, or a projector and control circuitry to control the devices. The display device 451 may include touch circuitry adapted to detect a touch, and/or sensor circuitry (e.g., pressure sensor, etc.) adapted to measure the intensity of force incurred by the touch.

The communication interface 460 may communicate with an external device to transmit and receive various data related to estimating core body temperature. The external device may include an information processing device, such as a smartphone, a tablet PC, a desktop computer, a laptop computer, and the like. For example, the communication interface 460 may transmit a body temperature estimation result to the external device, such as a smartphone and the like, so that a user may manage and monitor a component analysis result with a device having relatively high performance.

The communication interface 460 may communicate with the external device by using various wired and wireless communication techniques including Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, 5G, and 6G communications, and the like. However, the communication techniques are not limited thereto.

Figure 5:
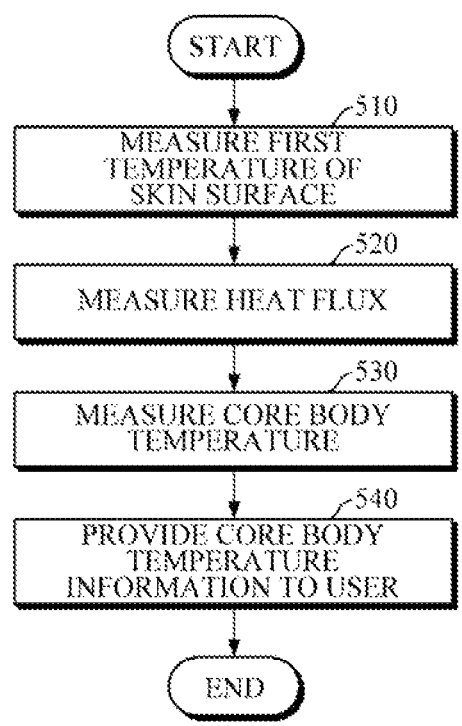
FIG. 5 is a flowchart illustrating a method of estimating core body temperature according to an embodiment of the present disclosure.

FIG. 5 is a flowchart illustrating a method of estimating core body temperature according to an embodiment of the present disclosure.

The method of FIG. 5 is an example of a method of estimating core body temperature performed by the electronic devices 100 and 400 according to the embodiments of FIGS. 1 and 4, which are described above such that the method will be briefly described below in order to avoid redundancy.

Referring to FIG. 5, the electronic device may first measure a first temperature of a skin surface in operation 510 by using the temperature sensor when an object comes into contact with the main body, and may measure heat flux in operation 520 by using the heat flux sensor when the object comes into contact with the main body.

The heat flux may be estimated by measuring a voltage difference between the first surface and the second surface of the thermogalvanic cell of the heat flux sensor, which is caused by a temperature difference between the first surface and the second surface. An electrolyte material contained in the thermogalvanic cell may be a solid material produced by absorbing an electrolyte solution, and may be in the form of cellulose or gel-like substance.

Then, the electronic device may estimate a user's core body temperature based on the first temperature and the measured heat flux in operation 530. For example, the electronic device may estimate the user's core body temperature based on a linear combination of a ratio between the measured heat flux and a predetermined skin heat transfer coefficient with the first temperature.

Subsequently, the electronic device may provide the estimated core body temperature to the user through the output interface by a visual or non-visual method in operation 540. For example, if the estimated core body temperature value falls outside a (predetermined) normal range, the electronic device may provide the user with warning information by changing color, line thickness, etc., or by displaying the abnormal value along with the normal range, so that the user may easily recognize the estimated value. Further, along with or without the visual display of the body temperature information on the display device 451, the electronic device may provide the user with the body temperature information in a non-visual manner by voice, vibrations, tactile sensation, and the like using an audio output module, such as a speaker and the like, or a haptic module and the like.

FIGS. 6 to 11 are diagrams illustrating examples of structures of an electronic device for estimating core body temperature. Examples of the electronic device may include not only a smartwatch, but also a smartphone, a smart band, smart glasses, a smart necklace, and an ear-wearable device, but the electronic device is not limited thereto.

Figure 6:
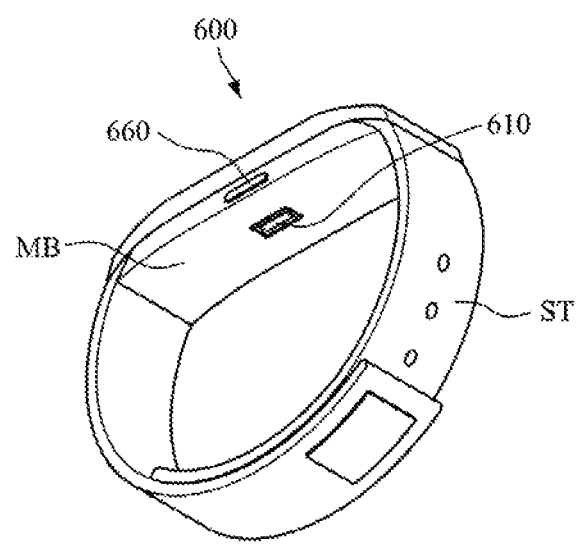
FIGS. 6 to 11 are diagrams illustrating examples of structures of an electronic device for estimating core body temperature.

Referring to FIG. 6, the electronic device may be implemented as a smart watch-type wearable device 600 which includes a main body MB and a wrist strap ST.

The main body MB may be formed in various shapes. A battery may be embedded in the main body MB and/or the strap ST to supply power to various components of the wearable device. The strap ST may be connected to both ends of the main body to allow the main body to be worn on a user's wrist, and may be flexible so as to be wrapped around the user's wrist. The strap ST may be composed of a first strap and a second strap which are separated from each other. One ends of the first strap and the second strap are connected to both sides of the main body MB, and the first strap and the second strap may be connected to each other via a fastening means formed at the other ends thereof. In particular, the fastening means may be formed as magnetic fastening, Velcro fastening, pin fastening, and the like, but is not limited thereto. Further, the strap ST is not limited thereto, and may be integrally formed as a non-detachable band.

The main body MB may include a sensor 610, a processor, an output interface, a storage, a communication interface, and the like. However, depending on the size and shape of a form factor and the like, some of the display, the storage, and the communication interface may be omitted.

A manipulator 660 may be formed on a side surface of the main body MB, as illustrated herein. The manipulator 660 may receive a user command and may transmit the received command to the processor. In addition, the manipulator 660 may have a power button to turn on/off the wearable device 600.

The sensor 610 may include a temperature sensor and a heat flux sensor which are disposed at different positions and attached to a structure in the main body. For example, a smartwatch may include a temperature sensor for measuring a first temperature of a skin surface when an object comes into contact with the main body, and a heat flux sensor for measuring heat flux. In particular, the heat flux sensor includes thermogalvanic cells, and a first electrode and a second electrode which are respectively disposed on a first surface and a second surface of each thermogalvanic cell, and may estimate heat flux by measuring a voltage, generated by a temperature difference between the first surface and the second surface, by using the first electrode and the second electrode. An electrolyte material contained in the thermogalvanic cell may be a solid material produced by absorbing an electrolyte solution.

The processor mounted in the main body MB may be electrically connected to various components as well as the sensor 610. When the strap is wrapped around a user's wrist and the main body is worn on the wrist, the processor may estimate the user's core body temperature based on the first temperature and the measured heat flux.

Figure 7:
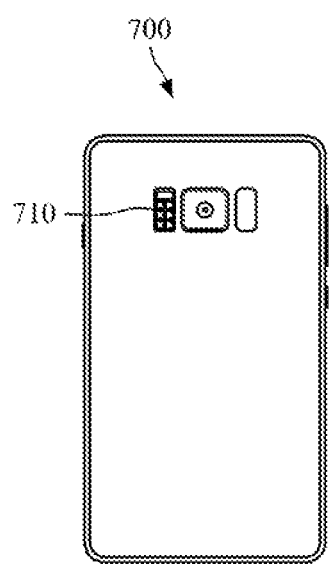

Referring to FIG. 7, the electronic device may be implemented as a mobile device 700 such as a smartphone.

The mobile device 700 may include a housing and a display panel. The housing may form the exterior of the mobile device 700. The housing has a first surface, on which a display panel and a cover glass may be disposed sequentially, and the display panel may be exposed to the outside through the cover glass. A sensor 710 including a temperature sensor and a heat flux sensor, a camera module and/or an infrared sensor, and the like may be disposed on a second surface of the housing.

For example, a plurality of sensors for obtaining data from a user may be disposed on a rear surface of a main body of the mobile device 700, and a fingerprint sensor disposed on a front surface of the main body, a power button or a volume button disposed on a side surface thereof, sensors disposed on other positions of the front and rear surfaces thereof, and the like may be provided to estimate a user's core body temperature.

In addition, when a user transmits a request for measuring the core body temperature by executing an application and the like installed in the mobile device 700, the mobile device 700 may measure a surface temperature and heat flux by using the temperature sensor and the heat flux sensor, and the processor in the mobile device 700 may measure the core body temperature based on the measured surface temperature and heat flux and may provide the user with the measured value and guidance information related to the core body temperature through a display.

Figure 8:
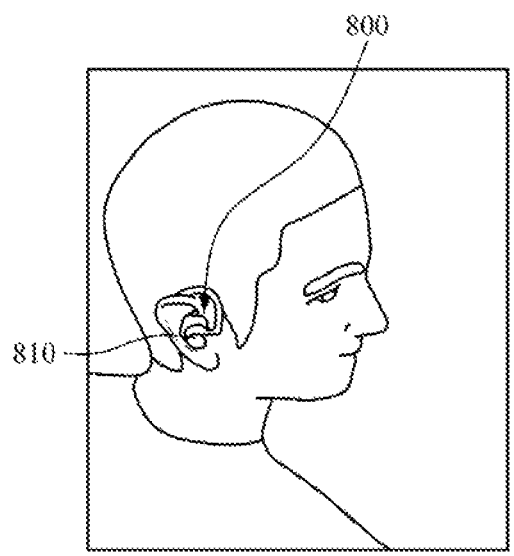

Referring to FIG. 8, the electronic device may also be implemented as an ear-wearable device 800.

The ear-wearable device 800 may include a main body and an ear strap. A user may wear the ear-wearable device 800 by wearing the ear strap on the auricle. The ear strap may be omitted depending on the shape of the ear-wearable device 800. The main body may be inserted into the external auditory meatus. A sensor 810 including a temperature sensor and a heat flux sensor may be mounted in the main body. The ear-wearable device 800 may provide a user with a core body temperature measurement result and/or core body temperature guidance information as sound, or may transmit the information to an external device, e.g., a mobile device, a tablet PC, a personal computer, etc., through a communication module provided in the main body.

Figure 9:
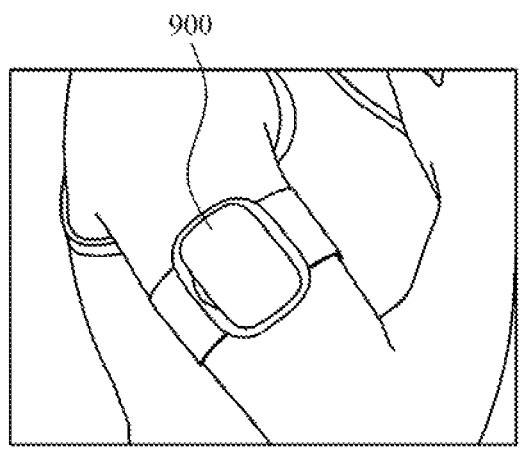

Referring to FIG. 9, an electronic device 900 may be implemented as a patch-type device.

For example, the electronic device 900 may be fixed to a body measurement location (e.g., upper arm) by a strap, and may measure a user's core body temperature. The electronic device 900 may provide the user with an estimated body temperature as sound or through a display, or may transmit the estimated body temperature to an external device, e.g., a mobile device, a tablet PC, another medical device, etc., through a communication module provided in the electronic device 900.

Figure 10:
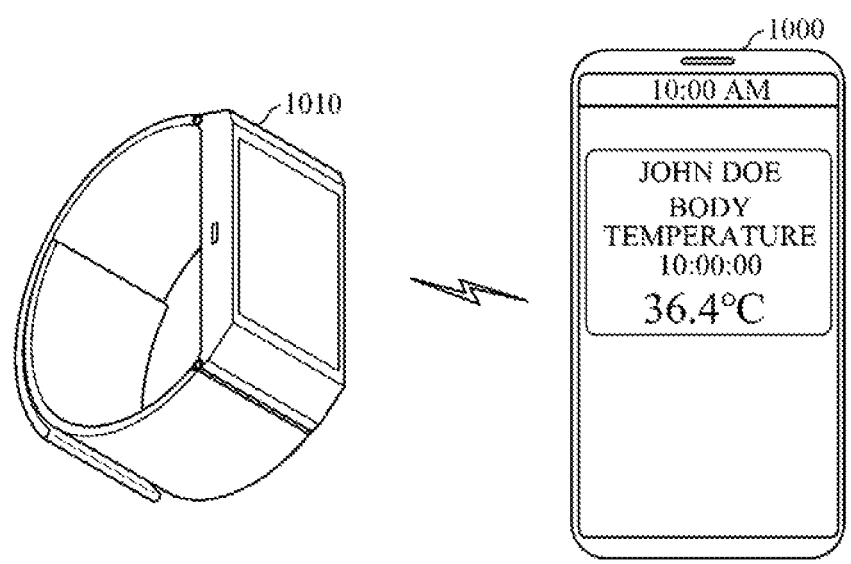

Referring to FIG. 10, the electronic device may be implemented as a combination of a wristwatch-type wearable device and a mobile device such as a smartphone. For example, a memory, a communication interface, and a processor for estimating body temperature may be mounted in a main body of the mobile device 1000. Upon receiving a request for estimating body temperature, the processor of the mobile device 1000 may control the communication interface to communicate with a communication module, mounted in a main body of a wearable device 1010, to obtain data. Further, upon receiving data, such as heat flux, first temperature, etc., from the wearable device 1010, the processor may estimate body temperature and may output the estimation result to a display of the mobile device as illustrated herein.

Figure 11:
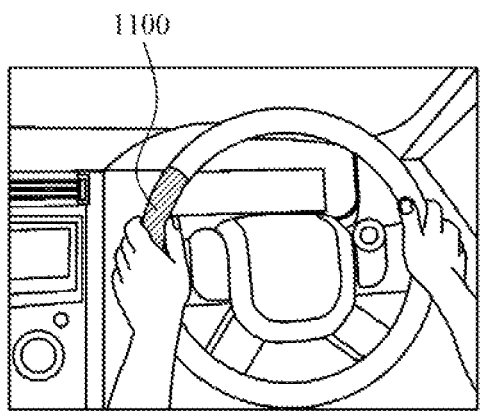

Referring to FIG. 11, an electronic device 1100 may be installed at the steering wheel of a vehicle.

For example, the electronic device 1100 may be installed at the steering wheel of a vehicle, on which the palm of a driver's hand is placed, and may estimate the driver's body temperature. The electronic device 1100 may provide the user with a body temperature estimation result as sound through an in-vehicle electronic device, or may transmit the estimation result to an external device, e.g., a mobile device, a tablet PC, other medical equipment, etc., through a communication module provided in the electronic device 1100. Further, the electronic device 1100 may transmit the body temperature estimation device to the in-vehicle electronic device, and the in-vehicle electronic device may regulate the temperature inside the vehicle based on the estimation result.

Figure 12A:
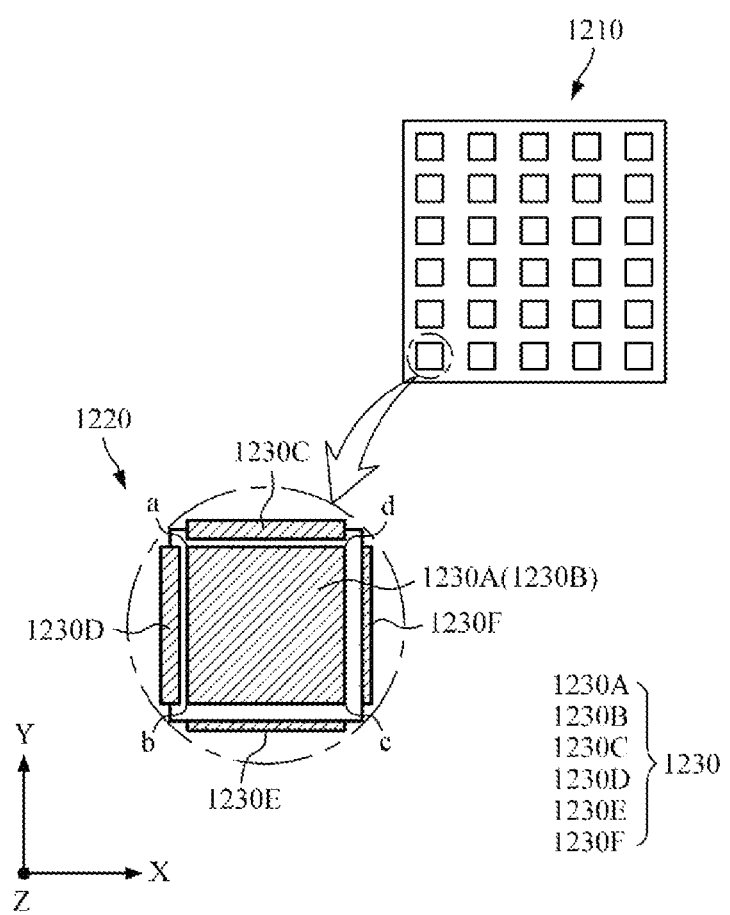
FIGS. 12A and 12B are diagram illustrating a structure of a sensor including thermogalvanic cells according to another embodiment of the present disclosure.
Figure 12B:
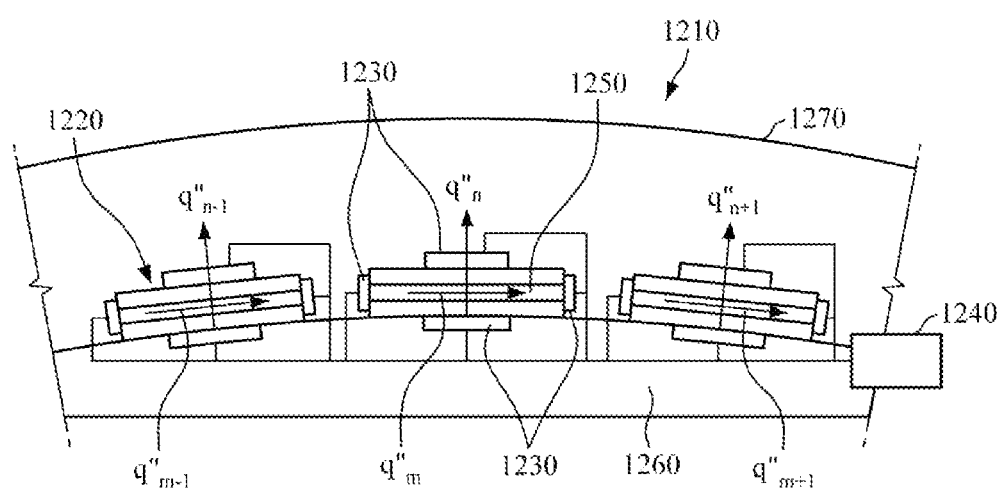

FIGS. 12A and 12B are diagram illustrating a structure of a sensor including thermogalvanic cells according to another embodiment of the present disclosure. FIG. 12A is a diagram illustrating a sensor 1210 including a plurality of thermogalvanic cells 1220 and a planar structure of the thermogalvanic cells 1220 in the sensor 1210 according to an embodiment of the present disclosure, and FIG. 12B is a diagram illustrating a cross-sectional structure of the sensor 1210.

Referring to FIGS. 12A and 12B, the sensor 1210 may include the thermogalvanic cells 1220, a plurality of electrodes 1230 disposed on the thermogalvanic cells 1220, and a processor 1240 configured to estimate heat flux by measuring a plurality of voltages by using the plurality of electrodes 1230. The thermogalvanic cells 1220, an electrolyte material 1250, a flexible board 1260, and a blocking member 1270 are described above with reference to FIG. 2B, such that a detailed description thereof will be omitted.

The plurality of electrodes 1230 disposed on the thermogalvanic cells 1220 may be two or more in number. For example, six electrodes 1230A-1230F may be disposed, each one being disposed on the respective surfaces of the thermogalvanic cell 1220 which is a hexahedron. Among the six electrodes 1230A-1230F, two electrodes 1230A and 1230B may oppose each other in a thickness direction (e.g., a z-axis direction) of each thermogalvanic cell 1220. In addition, referring to FIG. 12A, a plurality of electrodes having different sizes may be disposed on one surface of the thermogalvanic cell 1220. However, the arrangement of the electrodes is not limited thereto.

The processor 1240 may estimate heat flux by measuring a plurality of voltages, generated by a temperature difference between opposing surfaces of the thermogalvanic cell 1220, by using the plurality of electrodes 1230. Assuming that the thermogalvanic cell 1220 is a hexahedron, the processor 1240 may measure three voltages generated by a temperature difference between the opposing surfaces and may estimate three orthogonal heat fluxes, and may estimate a final heat flux by combining the estimated three heat fluxes.

Referring back to FIG. 12B, the processor 1240 may estimate a first heat flux (e.g., z-axis direction) by measuring a voltage, generated by heat flows ($q''_{n-1}$, $q''_n$, and $q''_{n+1}$) from the bottom to the top, by using electrodes disposed on the lower surface and the upper surface of the thermogalvanic cell 1220. In addition, the processor 1240 may estimate a second heat flux (e.g., an x-axis direction or a first horizontal direction) and a third heat flux (e.g., ay-axis direction or a second horizontal direction that is perpendicular to the first horizontal direction) by measuring a voltage, generated by heat flows ($q''_{m-1}$, $q''_m$, $q''_{m+1}$) from the left to the right, by using electrodes disposed on the left and right sides of the thermogalvanic cell 1220. That is, the processor 1240 may estimate the first to third heat fluxes, having directions in space with the heat flowing toward the opposing surfaces, by using the plurality of electrodes attached to the hexahedral thermogalvanic cell 1220, and the processor 1240 may estimate a vector value, obtained by combining the estimated first to third heat fluxes, as a final heat flux.

In addition, the processor 1240 may estimate a sheet resistance of the electrode disposed on the first surface (e.g., upper surface) of the thermogalvanic cell 1220, and may estimate a surface temperature of the electrode, disposed on the first surface, based on the estimated sheer resistance.

Generally, the sheer resistance refers to a surface resistance of a thin film having a thickness of 0.1 μm to several μm. The electrode for obtaining the surface resistance may be a thin film conductor and may be a material (e.g., carbon, gold, silver, nickel, etc.) in which no oxidation-reduction reaction with electrolyte takes place.

First, the processor 1240 may estimate the sheer resistance of the electrode, disposed on the upper surface, by applying a current to the thermogalvanic cell 1220, which may be represented by the following Equation 2.

$$R_{sh} = \frac{\pi}{\ln 2} \frac{V_{cd}}{I_{ab}} \quad \text{[Equation 2]}$$

Herein, $R_{sh}$ denotes the sheer resistance, and referring to FIG. 12A, Iab denotes the current flowing from a to b, and $V_{cd}$ denotes a difference of a voltage flowing from c to d.

Then, the processor 1240 may estimate specific resistance by using the sheer resistance and the thickness of the electrode based on the following Equation 3, and may estimate the surface temperature of the electrode by using a relationship between the estimated specific resistance and temperature.

$$\rho = \frac{R_{sh}}{d} \quad \text{[Equation 3]}$$

Herein, ρ denotes the specific resistance, and d denotes the thickness of the electrode.

Figure 13:
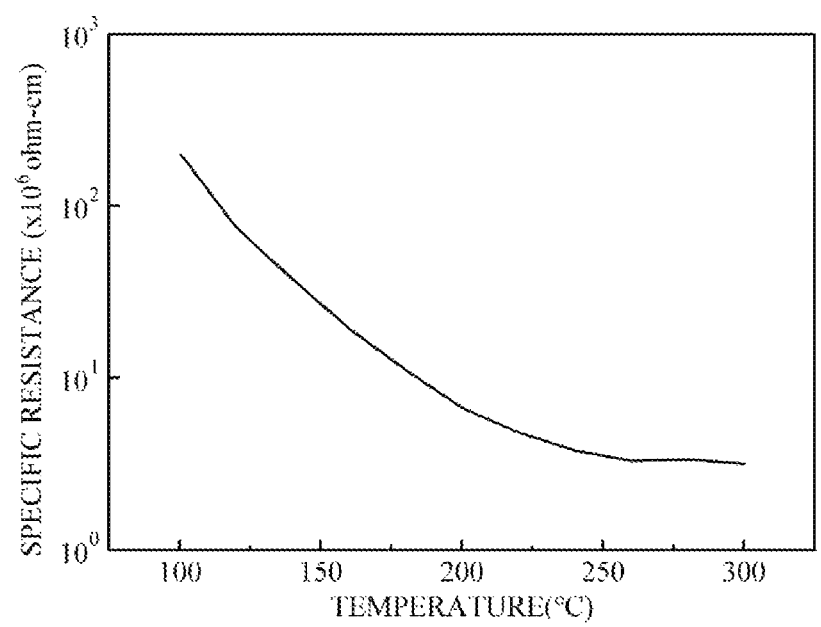
FIG. 13 is a graph showing a relationship between specific resistance and temperature.
Figure 13:
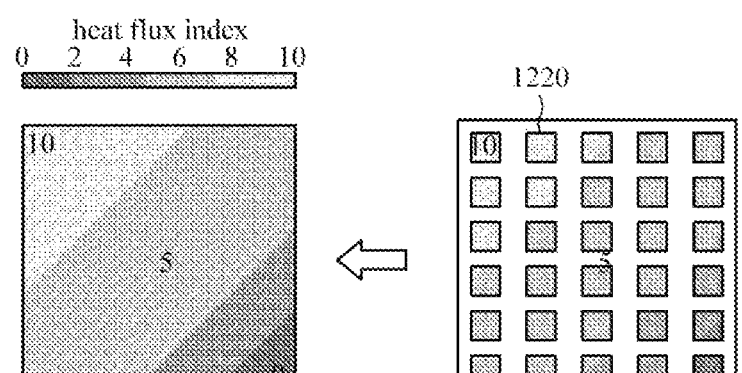

FIG. 13 is a graph (a) showing a relationship between specific resistance and temperature, along with a heat flux distribution map (b) that is generated from the measurement of heat flux for each of the plurality of thermogalvanic cells 1220.

In the graph (a) of FIG. 13, the x-axis represents temperature and the y-axis represents specific resistance, and the specific resistance and temperature are in inverse proportion. For example, by using the relationship between the specific resistance and temperature, the processor 1240 may obtain temperature corresponding to the estimated specific resistance and may estimate the temperature as the surface temperature of the electrode.

In addition, a plurality of thermogalvanic cells 1220 may be disposed which, for example, may be spaced apart from each other by a predetermined distance to be arranged in an array. In this case, the processor 1240 may create at least one of a temperature distribution (e.g., a temperature contour) and a heat flux distribution (e.g., heat flux contour) based on at least one of the heat flux, measured in the respective thermogalvanic cells 1220, and the surface temperature of the electrode disposed on the first surface. For example, the processor 1240 may create the temperature distribution or the heat flux distribution of a portion where a sensor is attached, by collecting the heat flux measured in each thermogalvanic cell 1220 and the measured surface temperature of the electrode on the upper surface of each thermogalvanic cell 1220. Specifically, referring to the heat flux distribution map (b) in FIG. 13, the heat flux distribution is obtained based on the heat flux that is measured by each of the plurality of thermogalvanic cells 1220. In a case where the measured heat flux values exhibit non-uniformity across the entire area of the heat flux sensor 122, the heat flux distribution map shows the variations in the measured heat flux values as collected by the plurality of thermogalvanic cells 1220.

In an embodiment, the heat flux and temperature, and the heat flux and temperature distribution may be estimated using a single heat flux sensor. That is, the temperature distribution may be obtained ot only based on the heat flux measured in the thermogalvanic cells, but also based on directly estimated temperature, resulting in enhanced accuracy when temperature of an object is estimated.

The present disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily deduced by programmers of ordinary skill in the art to which the invention pertains.

The present disclosure has been described herein with regard to preferred embodiments. However, it will be obvious to those skilled in the art that various changes and modifications can be made without changing technical conception and essential features of the present disclosure. Thus, it is clear that the above-described embodiments are illustrative in all aspects and are not intended to limit the present disclosure.

What is claimed is:

1. A heat flux sensor comprising:
   a thermogalvanic cell;
   a first electrode and a second electrode which are respectively disposed on a first surface and a second surface of the thermogalvanic cell; and
   a processor configured to estimate heat flux based on a voltage difference between the first surface and the second surface, which is measured by using the first electrode and the second electrode.

2. The heat flux sensor of claim 1, further comprising a plurality of thermogalvanic cells comprising the thermogalvanic cell,
   wherein the plurality of thermogalvanic cells are spaced apart from each other by a predetermined distance to be arranged in a grid pattern.

3. The heat flux sensor of claim 1, further comprising a flexible board disposed at a lower portion of the thermogalvanic cell and satisfying a predetermined range of curvature.

4. The heat flux sensor of claim 1, further comprising a blocking member configured to block outside air to prevent evaporation of water in an electrolyte contained in the thermogalvanic cell.

5. The heat flux sensor of claim 1, wherein the first electrode and the second electrode are arranged to oppose each other in a vertical direction of the heat flux sensor, and the heat flux sensor further comprises a third electrode and a fourth electrode that are arranged to oppose each other in a first horizontal direction, and a fifth electrode and a sixth electrode that are arranged to oppose each other in a second horizontal direction that is perpendicular to the first horizontal direction, and wherein the processor is further configured to estimate three orthogonal heat fluxes based on the voltage difference between the first electrode and the second electrode, a voltage difference between the third electrode and the fourth electrode, and a voltage difference between the fifth electrode and the sixth electrode.

6. The heat flux sensor of claim 1, wherein the processor is further configured to estimate a sheet resistance of the first electrode, and estimate a surface temperature of the first electrode that is disposed on the first surface based on the sheet resistance.

7. The heat flux sensor of claim 6, wherein the processor is further configured to create at least one of temperature distribution data and heat flux distribution data based on at least one of the heat flux and the surface temperature of the first electrode.

8. The heat flux sensor of claim 1, wherein the thermogalvanic cell contains an electrolyte material.

9. The heat flux sensor of claim 8, wherein the electrolyte material is in gel form.

10. The heat flux sensor of claim 8, wherein the electrolyte material is a solid material produced by absorbing an electrolyte solution.

11. The heat flux sensor of claim 10, wherein the solid material is cellulose.

12. A sensor comprising:
a thermogalvanic cell;
a plurality of electrodes disposed on the thermogalvanic cell; and
a processor configured to estimate heat flux by measuring a plurality of voltages, generated by a temperature difference between opposing surfaces of the thermogalvanic cell, by using the plurality of electrodes.

13. The sensor of claim 12, wherein the processor estimates three orthogonal heat fluxes by measuring three voltages generated by the temperature difference between the opposing surfaces.

14. The sensor of claim 12, wherein the processor estimates a sheet resistance of an electrode disposed on a first surface of the thermogalvanic cell, and estimates a surface temperature of the electrode, disposed on the first surface, based on the estimated sheet resistance.

15. The sensor of claim 12, wherein a plurality of thermogalvanic cells are provided, the respective thermogalvanic cells being spaced apart from each other by a predetermined distance to be arranged in an array, and wherein the processor creates at least one of a temperature distribution and a heat flux distribution based on at least one of the heat flux, measured in the respective thermogalvanic cells, and the surface temperature of the electrode disposed on the first surface.

* * * * *